United States Patent [19]

Flowers et al.

[11] 4,165,446
[45] Aug. 21, 1979

[54] DATA TRANSMISSION SYSTEMS (USING INTERNAL SYSTEMS EQUIPMENT, SERVICES AND PROCEDURES OF TELEPHONE COMPANIES)

[76] Inventors: Thomas E. Flowers, 155 Jackson St., #2003, San Francisco, Calif. 94111; Gordon S. MacDonnell, 2 Everson St., San Francisco, Calif. 94131

[21] Appl. No.: 785,874
[22] Filed: Apr. 8, 1977
[51] Int. Cl.² .................. H04M 11/00; H04M 15/00; H04M 15/16
[52] U.S. Cl. .............................. 179/2 DP; 179/7 R; 179/7.1 R; 179/9
[58] Field of Search ............. 179/2 DP, 7 R, 9, 7.1 R
[56] References Cited
FOREIGN PATENT DOCUMENTS

| | | | |
|---|---|---|---|
| 1181267 | 5/1961 | Fed. Rep. of Germany | 179/7.1 R |
| 1921088 | 2/1971 | Fed. Rep. of Germany | 179/2 DP |
| 926972 | 5/1963 | United Kingdom | 179/7.1 R |
| 926973 | 5/1963 | United Kingdom | 179/7.1 R |

OTHER PUBLICATIONS

Post Office Electrical Engineer's Journal, (England), vol. 67, Pt. 2, pp. 88-94, Jul. 1974.
"Experimental Packet-Switched Data-Transmission Service: Network Design and Implementation," D. Hadley et al.

Primary Examiner—George G. Stellar

[57] ABSTRACT

A method whereby data is transmitted from a data supplier's data bank to a data user upon request, using the data supplier's system and internal systems, equipment, services and procedures of telephone companies, including automatic number identification equipment, counters and timers, and billing procedures.

4 Claims, 2 Drawing Figures

FLOW CHART ALTERNATIVE 1

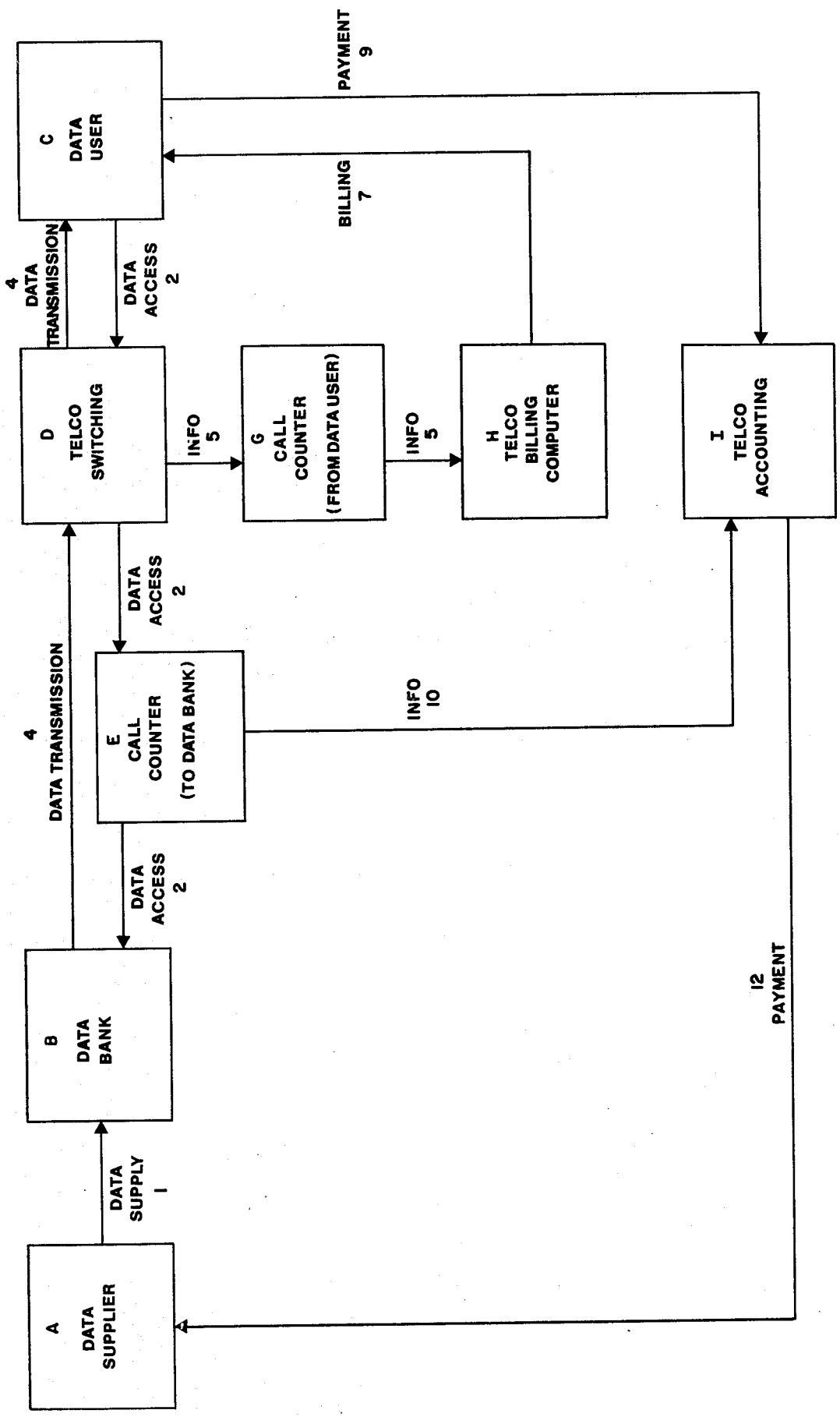

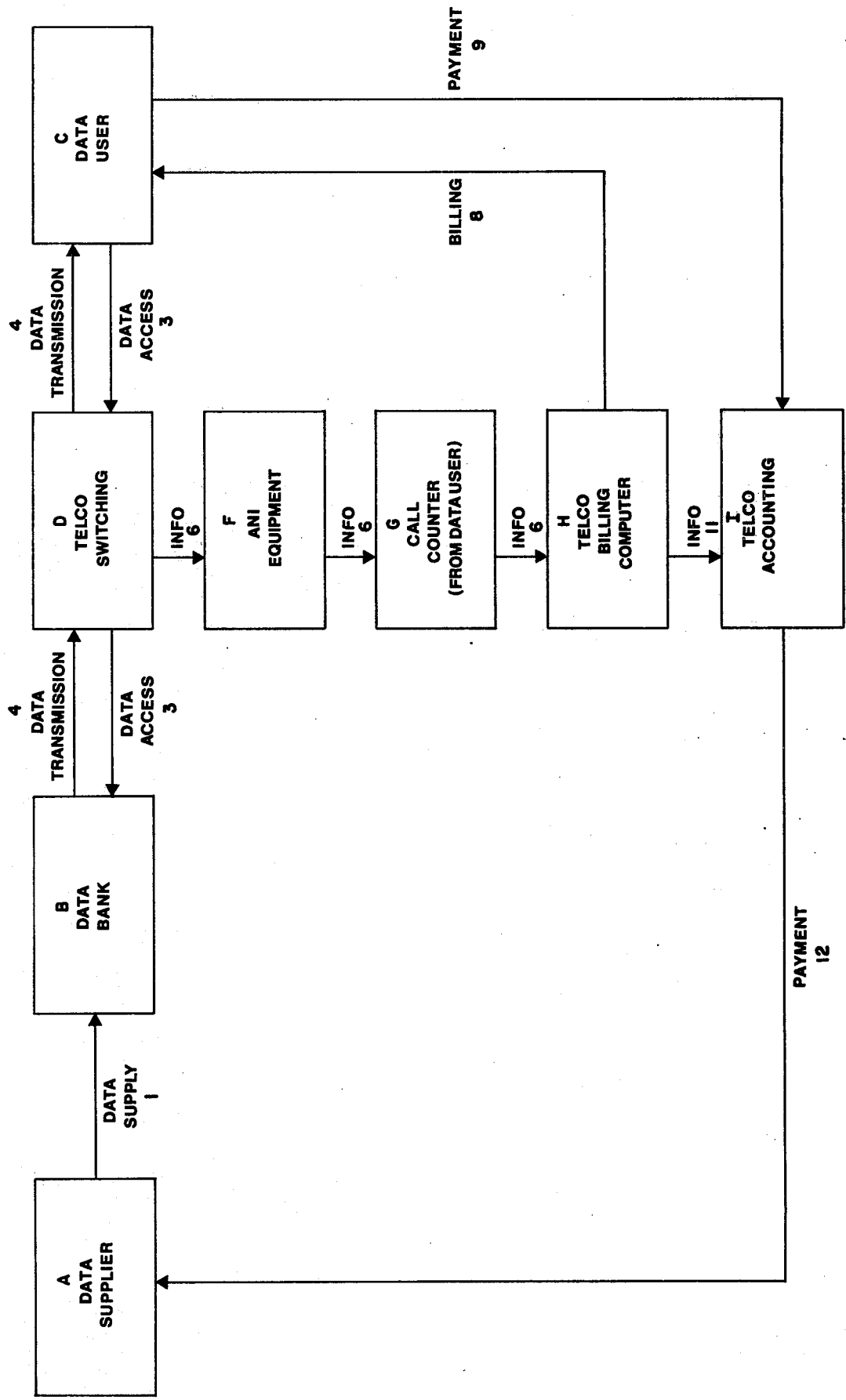

DATA TRANSMISSION SYSTEMS (USING INTERNAL SYSTEMS EQUIPMENT, SERVICES AND PROCEDURES OF TELEPHONE COMPANIES)

BACKGROUND OF THE INVENTION

Telephone operating companies ("telcos") provide telephonic communications to subscribers of their services by utilizing telephone network systems which are comprised of telephone lines (and airwave communications), switching equipment, terminal equipment (including telephones and computer terminals), and other equipment. The telcos offer such services in accordance with tariffs approved by governmental regulatory agencies. Customers are allowed to use existing systems and services as they have evolved within the telcos and their parent companies and the research and manufacturing subsidiaries of the parent companies. The two largest American telco holding companies and their research and manufacturing subsidiaries, and their telcos, have never conceived of or allowed the internal use of their systems, equipment, services and procedures to supplement the programs and/or services offered by subscribers to other subscribers.

SUMMARY OF THE INVENTION

The method provides for the transmission of data from a data supplier to a data user utilizing the internal systems, equipment, services and procedures of a telco to supplement the service center equipment to the data supplier and the access terminal equipment of the data user. It includes the use the automatic number identification equipment ("ANI") of the telco to identify the data user, the counting and timing equipment of the telco to count and time access calls by the data user, the counting and timing equipment of the telco to count and time calls to the service numbers of the data supplier's service center, the automatic billing by the telco of both the telco charges and the data supplier's charges to the data user, and financial settlements between the telco and the data supplier.

Alternative 1 is one embodiment of the invention. Alternative 2 is a second embodiment of the invention.

Alternative 1, depicted in FIG. 1, would be used when the total of the telco charges and the data supplier's charges are within the standard message unit charges of the telco. The telco (or the data supplier) would merely count and time the calls to the service center numbers, and the telco would pay the data supplier for its portion of the standard message unit charges.

Alternative 2, depicted in FIG. 2, would be used when the total of the telco charges and the data supplier's charges exceed the standard message unit charges of the telco. The telco would use its ANI equipment to identify the data user, the telco would count and time the incoming calls from each data user, the telco would bill and collect from the data user at special rates agreed upon between the telco and the data supplier (the total of the telco charges and the data supplier's charges) using its standard equipment and procedures for counting, timing and billing, and the telco would pay the data supplier for its charges.

The data supplier could use any method of storing and retrieving data including, but not limited to, holographic systems, magnetic tapes, discs and cards, and solid state, or paralled combinations of these devices.

The service center or data bank could be located either within the premises of the telco, or elsewhere.

Access to the data by the data user would usually be through Touch-Tone pads or rotary dials on telephones, or through terminal equipment such as Transaction Phones.

The basic advantages of the method is that data can be supplied to data users in a more efficient and economical manner than can be done through the use of any existing systems and methods. The data supplier need only announce the availability of the data and the telephone service numbers of the service center. This can be done in part by announcements distributed with the regular telco billings to its commercial users. There is no need for the data supplier to contract with individual data users. There is no need for the data user to identify itself either by voice or number when it accesses the data bank at the service center. There is no need for any voice contact, although voice contact may be used in some applications. There is no need for the telco to transmit any information or data to the data supplier except for summary information relative to the total number and total time of calls to each data bank service number. Duplicate billing (by the telco and the data supplier) is eliminated. There is no need for the data supplier to require a minimum monthly payment from the data user. The equipment and lines of the telco are used for much shorter periods of time than they are used through the use of any existing systems and methods. The method is particularly desirable to the telcos when the response time of the data bank is very short, such as a simple approval or disapproval signal in a credit card or bank account verification system.

The data bank can include a paralleling of memory systems. This leads to the advantage, for example, of paralleling a holographic memory, which is dense and fast but which may not be current, with a magnetic memory, which is slower but easier to keep current.

Both the Data Supplier and the Data User are subscribers of the telcos. The Data Supplier would pay at negotiated rates for all services provided by the telco including the regular use of its equipment and lines, and for special services such as billing, advertising, and perhaps operational functions (i.e., isertion of updated information), and the use of space on the telco premises. The Data User, under Alternative 1, would pay the standard message unit rate for calls to the Data Bank and, under Alternative 2, would pay a special surcharge rate for calls to the Data Bank service numbers.

DETAILED DESCRIPTION OF INVENTION

Refernce is made to FIG. 1 (Flow Chart Alternative 1) and

FIG. 2 (Flow Chart Alternative 2), included herewith.

Following are descriptions of the lettered network blocks:

A—The Data Supplier is any party which has data to provide on either a profit or a non-profit basis to any party who would want to call the service number of the Data Supplier.

B—The Data Bank is the physical location of the information provided by the Data Supplier. The memory could be in any form including, but not limited to, holographic film, magnetic tape or disc, solid state, or paralleled combinations of these devices, or human access to computerized or printed data. It could be located on the premises of either the telco or the Data Supplier.

C—Data User is any party which may desire to access the Data Bank.

D—Telco Switching is any type of switching equipment or manual switching used by the telco.

E—Call Counter (To Data Bank) is call counting and timing equipment used to count and time calls to the service number of the Data Bank. It could be located on telco premises and operated by telco personnel, or it could be located on the premises and operated by the Data Supplier.

F—The ANI Equipment is the automatic number identification equipment of the telco used to identify the Data User calling the Data Bank.

G—Call Counter (From Data User) is telco call counting and timing equipment used to count and time calls from the Data User.

H—Telco Billing Computer is the equipment used by the telco to automatically bill the Data User. It could be electronic, electro-mechanical, mechanical, or human.

I—Telco Accounting is the telco accounting office which receives information from the Call Counter (To Data Bank) in Alternative 1 and from the Telco Billing Computer in Alternative 2, receives payments from the Data User, and transmits payments to the Data Supplier.

Following are descriptions of the steps in the method of Alternative 1, depicted in FIG. 1, and indicated by the numbered interconnecting lines:

Data Supplier A, via line 1, sets up Data Bank B and provides updated information as required.

Data User C, via line 2, accesses Data Bank B through Telco Switching D and Call Counter (To Data Bank) E.

Data Bank B, via line 4, transmits data to Data User C through Telco Switching D.

Information is provided via line 5 by Telco Switching D and Call Counter (from Data User) G to Telco Billing Computer H regarding number and timing of calls from Data User C. p1 Data User C via line 7 is billed by Telco Billing Computer H at standard message unit rate.

Data User C, via line 9, makes payment to Telco Accounting I.

Call Counter (To Data Bank) E, via line 10, provides information to Telco Accounting I, relative to the number and total time of calls to Data Bank B.

Telco Accounting I, via line 12, makes payment to Data Supplier A at negotiated rate based on the number and timing of calls to Data Bank B.

Following are descriptions of the steps in the process of Alternative 2, depicted in FIG. 2, and indicated by the numbered interconnecting lines;

Data Supplier A, via line 1, sets up Data Bank B and provides updated information as required.

Data User C, via line 3, accesses Data Bank B through Telco Switching D.

Data Bank B, via line 4, transmits data to Data User C through Telco Switching D.

Information is provided, via line 6, by ANI equipment F and Call Counter (From Data User) G to Telco Billing Computer H regarding number and timing of calls from Data User C.

Data User C, via line 7, is billed by Telco Billing Computer H at special surcharge rate.

Data User C, via line 8, makes payment to Telco Accounting I.

Telco Billing Computer H, via line 11, provides information to Telco Accounting I relative to the number and total time of calls to the Data Bank B.

Telco Accounting I, via line 12, makes payment to Data Supplier A at negotiated rate based on the number and timing of calls to the Data Bank B.

We claim:

1. A method of acessing data in a data supplier's data bank by a data user and transmitting that data from the data bank to the data user which comprises:
    a. accessing said data supplier's data bank and signalling the data desired, by using the data user's data access terminal equipment to make a request for data;
    b. transmitting said data request from the data user to the data supplier through telephone operating company ("telco") switching equipment and transmission channels;
    c. transmitting the data requested from the data supplier to the data user, in response to said data request, through telco switching equipment and transmission channels;
    d. identifying the data user who made said request for data by using the telco automatic number identification ("ANI") equipment;
    e. counting and timing said data request and the transmitted data by using telco call counters and timing equipment whereby said call counters and timing equipment determine and record at least one characteristic of said data request and said transmitted data selected from (1) number of requests from each data user to said data supplier, (2) number of requests from all data users to said data supplier, (3) duration of total time of calls from each data user to said data supplier, and (4) duration of total time of calls from all data users to said data supplier;
    f. billing said data user for charges selected from the telco's charges and said data supplier's charges, by using means including the telco automatic billing equipment;
    g. collecting said charges from said data user; and
    h. transmitting said data supplier's charges collected by the telco to said data supplier.

2. A method as in claim 1, with the additional steps of simultaneously paralleling different types of memory storage and retrieval systems by the data supplier.

3. A system for the supply and transmission of data from a data supplier to a data user which comprises, in combination:
    a. access terminal equipment of said data user;
    b. telco switching equipment and transmission channels, for transmitting a data request from said data user to said data supplier;
    c. a data bank of said data supplier;
    d. telco switching equipment and transmission channels, for transmitting requested data from said data supplier to said data user;
    e. telco ANI equipment, to identify said data user calling said data supplier;
    f. telco call counters and timing equipment, for ascertaining the number and duration of calls between said data user and said data supplier;
    g. means for transmitting a request for data by said data user from said access terminal equipment through said telco switching equipment and transmission channels to said data bank of said data supplier;

h. means for transmitting the requested data from said data bank of said data supplier through said telco switching equipment and transmission channels to said data user;

i. means for using said telco ANI equipment to identify said data user accessing said data bank of said data supplier;

j. means for using said telco call counters and timing equipment to measure the number and time of calls to said data bank of said data supplier made by said data user;

k. means, including telco automatic billing equipment, for billing said data user for charges selected from the telco's charges and said data supplier's charges;

l. means for collecting said charges from said data user; and m. means for transmitting said data supplier's charges collected by the telco from the telco to said data supplier.

4. A system as in claim 3, with additional equipment in the data bank of the data supplier consisting of different types of memory storage and retrieval systems.